United States Patent
Von Aswege

(10) Patent No.: US 11,525,432 B2
(45) Date of Patent: Dec. 13, 2022

(54) WIND TURBINE AND METHOD FOR DETECTING AND RESPONDING TO LOADS ACTING THEREON

(71) Applicant: Wobben Properties GmbH, Aurich (DE)

(72) Inventor: Enno Von Aswege, Großefehn (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/645,948

(22) PCT Filed: Aug. 30, 2018

(86) PCT No.: PCT/EP2018/073346
§ 371 (c)(1),
(2) Date: Mar. 10, 2020

(87) PCT Pub. No.: WO2019/052827
PCT Pub. Date: Mar. 21, 2019

(65) Prior Publication Data
US 2020/0200146 A1    Jun. 25, 2020

(30) Foreign Application Priority Data
Sep. 18, 2017    (DE) ............... 10 2017 121 563.8

(51) Int. Cl.
*F03D 7/04*    (2006.01)
*F03D 7/02*    (2006.01)

(52) U.S. Cl.
CPC ........... *F03D 7/045* (2013.01); *F03D 7/0224* (2013.01); *F03D 7/0288* (2013.01)

(58) Field of Classification Search
CPC .... F03D 7/0224; F03D 7/0288; F03D 7/0292; F03D 7/044; F03D 7/045;
(Continued)

(56) References Cited

U.S. PATENT DOCUMENTS 7,476,985 B2    1/2009  Llorente Gonzalez
7,629,702 B2    12/2009 Schubert
(Continued)

FOREIGN PATENT DOCUMENTS

CN    101031720 A    9/2007
CN    102648345 A    8/2012
(Continued)

OTHER PUBLICATIONS

Office Action and Search Report for corresponding Chinese Application No. 201880060653.5, dated Dec. 1, 2020, with English translation, 19 pages.
(Continued)

*Primary Examiner* — Tulsidas C Patel
*Assistant Examiner* — S. Mikailoff
(74) *Attorney, Agent, or Firm* — Seed Intellectual Property Law Group LLP

(57) ABSTRACT

A method for operating a wind turbine for generating electrical power from wind, wherein the wind turbine has an aerodynamic rotor with a rotor hub and rotor blades of which the blade angle is adjustable, and the aerodynamic rotor can be operated with a variable rotation speed, and the wind turbine has a generator, which is coupled to the aerodynamic rotor, for the purpose of generating a generator power, wherein the generator can be operated with a variable generator torque, comprising the steps of: determining a loading variable which indicates a loading on the wind turbine by the wind, and reducing the rotation speed and/or the generator power in a loading mode depending on the
(Continued)

loading variable, wherein at least one force variable that acts on the wind turbine is used for determining the loading variable or as the loading variable.

5 Claims, 3 Drawing Sheets

(58) Field of Classification Search
CPC ........ F05B 2270/101; F05B 2270/1095; F05B 2270/32; F05B 2270/326; F05B 2270/327; F05B 2270/328; F05B 2270/331; F05B 2270/332; F05B 2270/705; Y02E 10/72
See application file for complete search history.

(56) References Cited

U.S. PATENT DOCUMENTS

| | | | |
|---|---|---|---|
| 7,964,979 B2 | 6/2011 | Miranda et al. | |
| 2009/0060740 A1 | 3/2009 | Stiesdal et al. | |
| 2009/0261588 A1 | 10/2009 | Von Mutius et al. | |
| 2015/0275860 A1 | 10/2015 | Carcangiu et al. | |
| 2016/0305404 A1* | 10/2016 | Esbensen | F03D 7/042 |
| 2016/0377058 A1 | 12/2016 | Caponetti et al. | |
| 2018/0245568 A1 | 8/2018 | Pedersen et al. | |

FOREIGN PATENT DOCUMENTS

| | | |
|---|---|---|
| DE | 19532409 A1 | 3/1997 |
| DE | 102006034106 A1 | 4/2007 |
| EP | 2927486 A1 | 10/2015 |
| EP | 3276164 A2 | 1/2018 |
| JP | 2007195315 A | 8/2007 |
| JP | 2017-133461 A | 8/2017 |
| KZ | 18480 B | 10/2011 |
| RU | 2572252 C1 | 1/2016 |
| WO | 2015086024 A1 | 6/2015 |
| WO | 2017036481 A1 | 3/2017 |

OTHER PUBLICATIONS

Office Action and Search Report for corresponding Russian Application No. 2020113599/12, dated Aug. 26, 2020, with English translation, 11 pages.

Office Action for corresponding Japanese Application No. 2020-515880, dated Apr. 13, 2021, with English translation, 9 pages.

Japanese Office Action, dated Nov. 9, 2021, for corresponding Japanese Application No. 2020-515880, with English Translation, 9 pages.

* cited by examiner

WIND TURBINE AND METHOD FOR DETECTING AND RESPONDING TO LOADS ACTING THEREON

BACKGROUND

Technical Field

The present invention relates to a method for operating a wind turbine. The present invention also relates to a wind turbine of this kind.

Description of the Related Art

Wind turbines are known and they generate electrical power from wind. However, if the wind is too strong, in particular when it reaches a storm wind speed, it may be advisable to switch off the wind turbine for protection purposes and, in particular, to move said wind turbine to the feathered position so that it no longer provides an area of attack for the storm.

In order to prevent a switch-off operation of this kind, or at least to postpone said switch-off operation such that the turbine actually has to be switched off only as late as possible, that is to say in the event of extremely high wind speeds, some solutions have proposed initially only reducing the rotation speed or power of the wind turbine in the event of very high, dangerous wind speeds. An example of this is specified in laid-open document DE 195 32 409. In that document, the rotation speed and the power are reduced starting from an earlier switch-off speed as the wind speed increases further, instead of switching off the wind turbine at that point.

Although control in this way has proven expedient, improvements can be provided.

For example, a loading on the wind turbines is not exclusively the result of the prevailing, specifically averaged, wind speed, but rather the gustiness of the wind can also play a role in the loading. A change in the wind direction can also play a role in the loading.

The gustiness could be taken into consideration by the characteristic curves moving apart corresponding rapidly, that is to say when a gust is considered to be only a rapid change in the wind speed. However, correspondingly rapid control may be necessary in this case.

A changing wind direction can be taken into consideration by a corresponding azimuth angle adjustment. However, rapid control would be required in this case too for the purpose of achieving a reduction in loading.

In addition, settings of the wind turbine, both in respect of a varying wind speed and also a varying wind direction, particularly also the blade angle of the rotor blades, are changed in the event of rapid control of said kind, and this in turn influences the loading.

Likewise in addition, modern wind turbines have increasingly larger rotors, with diameters of 140 meters and more being possible. In the case of large rotor diameters of this kind and a correspondingly large rotor area, specifically the area which is covered by the rotor blades, locally varying wind speeds then also play a role.

Ultimately, there are many factors which can increase the loading on the wind turbine. It should also be noted that overloading of the wind turbine does not automatically lead to damage, but rather fatigue phenomena can have an influence on the overall service life of the wind turbine. In this respect, an expected storm loading and the reaction to it already play an important role in terms of the design of the wind turbine.

One possible way of countering this problem would be to form a loading-reducing manner of operation for the wind turbine such that a safety reserve is provided. Therefore, the wind turbine can, for example, be carefully operated at a lower rotation speed and with less power than perhaps would be necessary. Control of this kind could ensure the safety and the calculated run time of the wind turbine, but this would have to be at the expense of losses in yield.

The German Patent and Trade Mark office has searched the following prior art in the priority application relating to the present application: DE 195 32 409 A1; DE 10 2006 034 106 A1; US 2009/0060740 A1; US 2009/0261588 A1; WO 2015/086024 A1 and WO 2017/036481 A1.

BRIEF SUMMARY

Provided are techniques in which a wind turbine is operated at high wind speeds such that the wind turbine is not excessively loaded and nevertheless as high a yield as possible is achieved, wherein non-uniformities in the wind can preferably also be taken into consideration.

Provided is a wind turbine for generating electrical power from wind is operated, which wind turbine has an aerodynamic rotor with a rotor hub and rotor blades of which the blade angle is adjustable. The aerodynamic rotor can also be operated at a variable rotation speed. To this end, the wind turbine has a generator, which is coupled to the aerodynamic rotor, for the purpose of generating a generator power. The generator can be operated with a variable generator torque. The generator torque can be influenced, for example, by an excitation current in the rotor of the generator.

For the purpose of operating this wind turbine, it is proposed that a loading variable which indicates a loading on the wind turbine by the wind is determined. It is therefore proposed to take into consideration not only the wind speed but also to directly determine a loading variable and thereby obtain direct information about the loading on the wind turbine. This loading can then be directly taken into consideration and no safety margin or no very large safety margin has to be taken into consideration. Directly determining the loading variable also allows the loading to be identified and allows estimates to be made about influences on the remaining service life.

It is now proposed that the rotation speed and/or the generator power are reduced in a loading mode depending on the loading limit value. The rotation speed and the generator power, or at least one of the variables, are reduced when the loading variable reaches a predeterminable loading limit value. Therefore, the loading is absorbed, but initially there is no departure from a standard mode of the wind turbine. A changeover can then be made to a loading mode. This can take place depending on the loading variable, or else based on wind speed detection. If the loading mode is in operation, the rotation speed and/or the generator power can be reduced depending on the loading variable. It is particularly advantageous to reduce both variables since they both also reduce the loading on the turbine. However, initially reducing only one of the two variables and then also reducing the other variable, that is to say then reducing both variables, in the event of an increasing loading is also possible in particular.

In the simplest case, provision is made for the rotation speed and the generator power to be reduced in the loading mode simply when this determined loading variable has reached a predeterminable loading limit value. That is to say, a changeover is made to the loading mode when this loading limit value is reached. The prespecifiable loading limit value does not have to be a limit value starting from which the wind power installation is at risk, but rather this loading limit value can also be selected to be lower. Moreover, this can also mean or involve the rotation speed and generator power not being immediately reduced concurrently. However, the reduction in said rotation speed and generator power is provided in the loading mode, preferably also at the same time and right at the beginning of the changeover to the loading mode.

To this end, provision is made for a force variable that acts on the wind turbine to be used for determining the loading variable. Said force variable can directly be a translatory force, or a force variable that acts in a rotation direction or bending direction. This can also mean that this force variable that acts on the wind turbine is directly used as the loading variable. Therefore, a mechanical loading forms the basis here. In this respect, the force variable that acts on the wind turbine can synonymously also be called a mechanical loading that acts on the wind turbine. This also includes bending and torsion moments or combinations thereof.

In any case, it has been identified that direct loading-reducing or loading-limiting control can be achieved when a force variable that acts on the wind turbine is directly used. A clear loading can then be derived overall from this force variable. In this case, a loading of this kind can also occur for different components of the wind turbine. Different loadings at different locations of the wind turbine may be derived from a loading at a specific location from empirical values or previously recorded simulations. In this case, a loading, particularly the force variable under consideration, is not necessarily to be taken into consideration only statistically as a value. Changes in the force variable, which changes can also occur in an oscillating manner for example, are also taken into consideration. The force variable that forms the basis can lead to relevant loading peaks at different points of the wind turbine depending on properties of said kind.

The force variable that acts on the wind turbine can be determined, in particular, from measurements, but it is also possible here for said force variable to be made up of a plurality of measurements or for a plurality of measurements at different locations of the wind turbine to form the basis for determining said force variable. For example, in the case of a modern wind turbine with three rotor blades, a loading measurement can be performed at each rotor blade and a force variable that is active overall can then be determined at another location from these loading measurements at the three rotor blades.

A loading mode describes, in particular, a storm situation or storm mode in which wind speeds which correspond to a storm, or higher wind speeds, occur. In particular, high wind speeds of this kind can subject a wind turbine to severe loading or even put said wind turbine at risk.

Provision is preferably made for a hub bending moment to be detected, and for the hub bending moment to be used for determining the loading variable or as the loading variable. A hub bending moment of this kind is particularly suitable as a loading variable because forces which act on all of the rotor blades act on the hub overall and therefore critically influence the hub bending moment. In this case, the hub bending moment acts directly in the vicinity of the rotor blades which absorb the majority of the loading on the wind turbine. In addition, the hub is in the immediate vicinity of a rotor bearing and therefore of a component which critically has to absorb loadings on the aerodynamic rotor and may be damaged as a result.

In addition, the hub bending moment can contain not only absolute values but rather also directional values.

Particularly in the case of a storm situation, not only can high wind speeds occur but rather the wind is also generally not homogeneous in this case. The wind speed can change rapidly not only over time but also with location, particularly with height. Modern wind turbines have large rotor areas and a wind speed that varies over the rotor area can lead to non-uniform loadings on the rotor. This can be reflected, in turn, in a hub bending moment. The wind turbine can also sometimes be subjected to more severe loading or put at risk by non-uniform loadings of this kind than by a high wind speed alone. Therefore, it is also possible for the wind speed to not be very meaningful as a criterion for a loading on the wind turbine because a specific wind speed, depending on how and the severity to which it varies, can lead to very different loadings which are not reflected in a value above the level of the wind speed.

The actual loading can be taken into consideration more effectively by determining an actual loading variable, particularly a hub bending moment. In particular, a non-uniform loading over the rotor field can be taken into consideration and a targeted response to it can be made. In particular, the rotation speed and/or the generator power can be reduced earlier or later based on a wind speed value, depending on the wind field.

Instead of taking into consideration the hub bending moment, or in addition thereto, a shaft bending moment, an axle bending moment and/or a tower head bending moment can also be used for determining the loading variable or as the loading variable. The explanations and advantages described in relation to the hub bending moment can also be analogously applied to these moments.

According to one embodiment, provision is made for at least one strain measurement to be carried out on the rotor hub and also or alternatively at least on one rotor blade, in particular on or at the blade root, for detecting the force variable that acts on the wind turbine, in particular for detecting the hub bending moment. A strain measurement is preferably performed on each rotor blade or on or at each blade root. A plurality of strain measurements are preferably performed there in each case, in particular in each case two strain measurements in order to be able to record different loading directions in this way.

In this case, it has been found that a loading measurement of this kind by means of strain measurements, that is to say a measurement in each case by means of at least one strain gauge, can be performed in a simple manner and can often also be used for other applications. In particular, a strain measurement of this kind can be provided for individual blade adjustment. However, it is proposed here to use the strain measurement in order to detect a force variable that acts on the wind turbine overall, specifically a force variable which is suitable for determining the loading variable. Therefore, a loading variable which is relevant to the wind turbine overall is determined in this way, said loading variable then being used for a loading mode for reducing the rotation speed and the generator power.

According to a further embodiment, the method is characterized in that the process of determining the loading variable is performed by means of a system-related estimation algorithm based on a measurement which is representative of the loading. In this case, a plurality of measurements at a plurality of locations can also be used. In this case, a measurement is to be understood substantially as a continuous measurement. In this case, a continuous measurement also includes a quasi-continuous measurement in which, for example, measurement is performed discretely with a high sampling rate.

In particular, strain measurements on the rotor hub and also or alternatively on the blade root of the rotor blades or in the region of the blade root of the rotor blades are used as the basis. A location in the region of the blade root is particularly on a blade adapter by means of which the rotor blade in question is fastened to the hub. Therefore, these measurements or at least the one representative measurement are/is used as the input signal or input variable for an estimation algorithm of this kind.

A system-related estimation algorithm of this kind can be designed, in particular, as a calculation prespecification which knows a relationship between the respective measurement and the loading variable that is to be determined. For example, loadings on the blade roots can be measured by means of strain gauges. From said loadings, the bending moment can then be detected by means of the system-related estimation algorithm as the loading variable. To this end, the calculation algorithm, which can form the estimation algorithm here in this example, is based on a relationship between respective loadings on the blade roots and a resulting bending moment, specifically hub bending moment for example.

Relationships of this kind can be included, for example, by representative measurements when input and output variables are measured in a test set-up, that is to say the measurements at the blade roots as input variables and the resulting hub bending moment as the output variable here, and from this a system model for this relationship can be created, for example, by known methods for system identification. It is also possible for relationships of this kind to be determined by means of load simulations. In load simulations of this kind, good models of the elements in question of the wind turbine form the basis. For example, models of this kind can be determined by means of methods with finite elements. A relationship can be included and taken into consideration for each rotor blade. In this example, a partial hub bending moment in respect of magnitude and direction is then given by the loading on each blade root, usually possibly on the basis of three rotor blades and therefore three blade roots here. This partial hub bending moment can be taken into consideration or represented, for example, as a corresponding vector, specifically force variable vector. These three partial hub bending moments, when there are three rotor blades, can then be added up vectorially to form an overall hub bending moment.

Matrix multiplication can preferably also be performed in order to determine the hub moment from the blade root bending moment. Matrix multiplication of this kind can also be derived from a force equilibrium.

However, it is also possible for yet further forces, in particular weight forces, to be added to the hub bending moment. Subtraction may be performed here, provided that a weight force, depending on the position of the rotor blade, also acts on the respectively absorbed blade loading at the blade root. According to one variant, a weight loading of this kind can, in each case taking into consideration the blade position, be included in the relationship between the respective loading on the blade root and the resulting partial bending moment. Therefore, if, for example, a blade is standing perpendicularly upward, that is to say in the so-called 12 o'clock position, and—as an illustrative example—no wind is acting on the rotor blade, this could mean that no loading on the blade root is detected by strain gauges either. However, it is known from the position of the rotor blade and its weight that this weight alone already leads to a hub bending moment and precisely that can also be taken into consideration. As an alternative, said strain gauges can also take into consideration weight forces of this kind.

This is a preferred example, in respect of the measurement values used too. However, it is also possible, for example, to determine a total bearing loading from the loadings on the blade root. It is also possible to detect a movement of the tower head and to draw conclusions about a loading on the tower head therefrom.

According to a further variant, the system-related estimation algorithm can be realized as a state observer. The representative measurements or the at least one representative measurement can be entered in this state observer as an input variable. The state observer can then contain a model which has, for example, a rotation speed, which is given by the loadings amongst other things, as the output variable. In this case, the model behaves like the wind turbine. By way of comparing the output of the rotation speed of this observer and the actual rotation speed of the wind turbine, which is generally present with a high degree of accuracy, an observation error can be formed and fed back for setting the observer. If, for example, a rotation speed is corrected by adjusting the blade angle, the signal for adjusting the blade angle can form a further input variable which is also input into the model. Alternatively, the blade-adjusting signal can form a single input variable in order to provide a further example.

As an alternative, the system-related estimation algorithm or the state observer can be realized as Kalman filters.

According to a further embodiment, it is proposed that the loading limit value is defined depending on a loading variable which is detected as the base loading in a normal mode with nominal wind prevailing. Therefore, a loading is detected in the normal mode with nominal wind prevailing, which in this respect can synonymously also be called the nominal mode. A loading of this kind can be recorded in advance in simulations, or else during ongoing operation. The loading limit value can then be defined at a higher value, in particular at twice as high a value, depending on a loading measurement of this kind. However, system-related preliminary investigations can also define the amount by which the loading limit value is greater than the base loading which was established in the nominal mode.

This has the advantage that systematic measurement errors, which can also lead to a correspondingly incorrect loading variable, are less problematical since if, for example, a determination of the loading variable which is 20% too low takes place, this error also occurs when determining the base loading. This leads, in turn, to the loading limit value correspondingly also being estimated to be 20% too small. Therefore, a loading variable that is determined to be too small is compared with a loading limit value that is determined to be too small, and therefore the result of the comparison is still substantially correct.

The rotation speed and also or alternatively the generator power are preferably reduced depending on the detected loading. Therefore, the determined loading variable in this respect forms an input variable for reducing the rotation speed or the generator power.

This can be done such that the loading variable does not exceed the loading limit value. Therefore, the rotation speed and the generator power are reduced as the loading variable increases, specifically such that the loading variable does not exceed the loading limit value. This can be done, for example, by means of corresponding control, in the case of which the loading limit value is used as the setpoint value and the loading variable is used as the actual value. A comparison of the setpoint value and actual value then takes place, in which comparison the loading variable is subtracted from the loading limit value, and a control algorithm can then reduce the rotation speed and the power by means of this so-called control deviation.

In this respect, it is also proposed to control the loading variable by reducing the rotation speed and the generator power to the loading limit. Therefore, a controller can be provided once, which controller is configured such that the loading variable does not exceed the loading limit value. This can mean that the loading variable can also lie far below the loading limit value. For example, a safety margin can be proposed, and said safety margin can be realized by way of a lower value than the loading limit value, for example, a value which is 10% below, being used instead of the loading limit value as the setpoint value.

If the loading variable is controlled at the loading limit value, the control arrangement will attempt, in principle, to correspondingly increase the rotation speed and the generator power if the loading variable has not yet reached the loading limit value.

According to one refinement, it is proposed that the rotation speed and the generator power are reduced in such a way that the loading variable does not exceed the loading limit value, and also the blade angle of each of the rotor blades is adjusted in the direction away from the wind, and also the generator torque does not exceed a generator nominal torque, and also the generator torque is reduced as the wind speed increases.

The rotation speed is reduced by adjusting the rotor blades away from the wind, and this leads to relief of loading. In addition, an angle of incidence onto the rotor blades is reduced, this likewise leading to relief of loading. In addition, provision is made for the generator torque to not exceed a generator nominal torque and therefore corresponding electrical overloading is avoided, but excessive mechanical loading by the torque is also avoided.

It is further proposed that the generator torque is reduced as the wind speed increases, and this could lead to an increase in rotation speed when the rotor blades are not sufficiently turned away from the wind. However, since a reduction in rotation speed is also proposed, the rotor blades are turned away from the wind to an appropriate extent that a reduction in rotation speed takes place in spite of the reduction in the generator torque. The generator power is also reduced in association with, specifically, the generator torque being reduced and the rotation speed being reduced.

Since a wind speed cannot be very accurately detected by conventional wind-measuring devices, particularly by a nacelle anemometer, estimation of a wind speed can be proposed here. In this case, the wind speed can be detected from the known blade angle, the set generator torque and the resulting rotation speed or a derivative of the rotation speed with respect to time. In order to improve wind speed estimation of this kind, it is proposed to additionally take into consideration the ascertained loading variable. An estimation of the wind speed of this kind can also be performed by a system-related estimation algorithm.

According to one embodiment, it is proposed that the rotation speed is reduced depending on the determined loading variable and the generator power is reduced depending on a rotation speed/power characteristic curve for the loading mode, and it is proposed for this purpose that the rotation speed/power characteristic curve for the loading mode differs from a rotation speed/power characteristic curve for the partial-load mode. In the partial-load mode, the wind is so weak that a generator nominal power cannot be reached. Therefore, a special rotation speed/power characteristic curve is prespecified here, and a rotation speed/power characteristic curve of this kind indicates a power value that is to be set, that is to say the value for the generator power, for the respectively current rotation speed. For example, the rotor blades can be adjusted such that the rotation speed is reduced, depending on the loading variable. A rotation speed is then established and a generator power is set in accordance with the rotation speed/power characteristic curve depending on this rotation speed. It may then be the case that this in turn has an influence on the rotation speed. The rotation speed can then change and a new value for the generator power can then be set again for the changed rotation speed, until a stable operating point is produced. This description serves for explanation and the described control usually leads to the control leading the operating point to a stable point on the rotation speed/power characteristic curve.

The rotor blades are preferably adjusted depending on the loading variable, preferably such that the loading variable is controlled at a fixed value. Therefore, as the wind loading increases, the blades are turned further away from the wind, so that the determined loading variable does not increase as a result of the increasing wind loading.

Said rotation speed/power characteristic curve for the loading mode is to be distinguished from a rotation speed/power characteristic curve for the partial-load mode. In the partial-load mode too, provision can be made for a generator power to be respectively set depending on a rotation speed. However, in this case, the rotor blades usually maintain a fixed blade angle and the change in rotation speed results solely from a change in the wind. A rotation speed/power characteristic curve of this kind in the partial-load mode can be used as a basis until the wind speed is reached or is above the nominal wind speed.

It is preferably proposed that the rotation speed/power characteristic curve for the loading mode, at least in a partial rotation speed range, in particular in a rotation speed range of from 10 to 90 percent of the nominal rotation speed, in each case has a higher power value than the rotation speed/power characteristic curve for the partial-load mode. The rotation speed/power characteristic curve for the loading mode therefore leads substantially to a higher power at the same rotation speed in comparison to the partial-load mode. The two rotation speed/power characteristic curves can converge close to the rotation speed zero and close to the nominal rotation speed.

According to one embodiment, it is proposed that, for feeding-in the electrical generator power, the electric current that is generated by the generator is rectified and supplied to a first DC voltage intermediate circuit. It is further proposed that the rectified current is supplied from the first DC voltage intermediate circuit to a second DC voltage intermediate circuit. In this case, a boost converter is arranged between the first and the second DC voltage intermediate circuit. This boost converter optionally boosts a first DC voltage of the first DC voltage intermediate circuit to a second voltage of the second DC voltage intermediate circuit. Furthermore, the electric current of the second DC voltage intermediate circuit is converted, by means of an inverter, into an electric alternating current for being fed into the electrical power supply system. To this end, it is now proposed that the boost converter boosts the first DC voltage to the second DC voltage only for rotation speeds below a changeover rotation speed, so that the second DC voltage is then higher than the first DC voltage. To this end, it is finally proposed that the changeover rotation speed in the partial-load mode is higher than in the loading mode.

As a result, it is possible to also match the feeding-in of electrical power, including the special actuation of the boost converter, to a storm mode. In other words, only a relatively small rotation speed range will use a boost converter mode in the loading mode. Therefore, a changeover to the boost converter mode is made only very late in the loading mode with respect to the wind speed, that is to say at very high wind speeds.

According to one embodiment, it is proposed that the hub bending moment varies between maximum and minimum hub bending moments depending on the rotor position and, in addition, it is proposed that the loading variable is determined depending on the maximum hub bending moments. Therefore, here, the relatively low hub bending moments are rejected and the maximum hub bending moments are determined. In this way, it is possible to ensure that the large hub bending moments, which are ultimately the most critical, are also actually taken into consideration.

In addition or as an alternative, it is proposed that the loading variable is determined depending on differences between the maximum and the minimum hub bending moments. In this case, a variant is possible in which solely these differences determine the loading variable. Here, it is taken into consideration, in particular, that the load fluctuations also increase in the event of severe loading by the rotation of the rotor. For example, variations of this kind in the hub bending moments can be produced by way of the respective rotor blade, when passing through the tower, that is to say when the rotor blade rotates past the tower, undergoing a severe fluctuation in loading which also increases as the wind speed increases. A wind speed which varies with height can also be a reason for variations in the hub bending moments, or other loading variables. It is also possible to take into consideration the use of loading fluctuations of this kind, that is to say the differences between the maximum and the minimum hub bending moment, additionally with absolute values of the hub bending moment for determining the loading variable.

In addition or as an alternative, the maximum hub bending moments can be taken into consideration as the loading variable in each case. Therefore, the loading variable is not indirectly determined depending on the maximum hub bending moments, but rather the maximum hub bending moments directly form the loading variable in each case. It goes without saying that, in so doing, the loading variable can be scaled for processing in the process computer.

According to a further variant, it is proposed that the differences between the maximum and minimum hub bending moments are taken into consideration as the loading variable in each case. Here too, these differences therefore form not only output variables, in order to determine a loading variable of this kind, but rather these differences are also directly used as the loading variable. It goes without saying that scaling is also possible here too.

Also provided is a wind turbine for generating electrical power from wind. A wind turbine of this kind comprises an aerodynamic rotor with a rotor hub and rotor blades of which the blade angle is adjustable. The rotor can additionally be operated at a variable rotation speed. Furthermore, said wind turbine has a generator which is coupled to the aerodynamic rotor and with which a generator power is generated. The generator can be operated with a variable generator torque.

The generator torque can be varied, amongst other things, by way of an excitation current being varied. In this respect, an externally excited synchronous machine is provided here in particular.

Furthermore, a detection device is provided for determining a loading variable, specifically a loading variable which indicates a loading on the wind turbine by the wind. The detection device therefore operates such that it determines a loading variable of this kind, for example, from measurements or a measurement, and this loading variable is then representative of a loading. The loading variable then indicates, for example, depending on its value, the extent to which the wind turbine is subjected to loading by the wind.

In addition, a control device is provided, which control device is designed for reducing the rotation speed and/or the generator power in a loading mode. A loading mode of this kind is one in which the loading variable reaches a predetermined loading limit value. This can also include the case of the loading variable exceeding the predetermined loading limit value. This can be a definition of the loading mode. However, it is also possible for the loading limit value to form an orientation value for the loading situation, it also being possible for said orientation value to be exceeded.

Therefore, it can initially be identified whether a loading mode is present. If said loading mode is present, the control device can then control the reduction in the rotation speed and in the generator power. This can take place, for example, such that the actuating signals for adjusting the rotor blades are output, so that the aerodynamic rotor absorbs less wind power, as a result of which the rotation speed and therefore also the generator power can be reduced. This can be implemented in terms of control such that a reduced setpoint rotation speed is prespecified for this purpose.

The detection device is also designed to use a force variable that acts on the wind turbine for determining the loading variable or as the loading variable. Accordingly, the detection device can record information relating to a force variable of this kind. Information of this kind can be processed to determine a force variable of this kind. The loading variable can then be determined depending on a force variable of this kind. As an alternative, this force variable can already represent the loading variable. However, it is also possible to use a plurality of forces that act on the wind turbine. The loading variable can then be determined therefrom. Even the use of a plurality of forces that act on the wind turbine can be taken into consideration as the loading variable when the loading variable is, for example, vectorial and as a result can contain a plurality of forces, for example, a longitudinal force and a transverse force.

The wind turbine is preferably designed for executing a method according to at least one of the embodiments described above. In particular, corresponding method steps, in particular method steps for control at the control device, can be implemented. In addition or as an alternative, method steps, in particular method steps for determining the loading variable in the detection device, can be implemented.

It is also possible for the wind turbine to have corresponding hardware, in particular measurement means for detecting physical variables, in particular electrical and/or mechanical variables.

According to one embodiment, it is proposed that at least one force-measuring means is provided for the wind turbine for detecting the force variable that acts on the wind turbine or for detecting the hub bending moment. In addition, at least one connection from the at least one force-measuring means to the detection device is provided in order to transmit measurement values of the at least one force-measuring means to the detection device in order to then determine the loading variable depending on these measurement values. Therefore, corresponding force variables can be measured and the results can be transmitted to the detection device by way of the force-measuring means. The detection device can then determine the loading variable from said results. Appropriate lines, in particular electrical lines, can be provided as the connection from the at least one force-measuring means to the detection device. Said lines can also be in the form of a data bus or signal bus. However, in principle, a radio connection is used at least in sections. In particular, the transmission over a rotary connection can take place by means of radio, optically or, for example, via a slip-ring or a combination of these possible options. Optical transmission is also possible here.

In particular, it is proposed that the at least one force-measuring means comprises a strain gauge on the rotor hub and/or on each rotor blade or on or at each blade root. In particular, strain gauges of this kind form the force-measuring means.

Therefore, the wind turbine can use these force-measuring means, particularly the strain gauge, to record corresponding forces and then determine the loading variable in the detection device from said forces. The loading variable is then directly dependent on mechanical measurements of this kind. Therefore, forces that actually occur are evaluated here in order to determine the loading variable therefrom. The loading variable is then possibly a simplified or combined value, or else force vector, but is based on force measurements and therefore based on actual mechanical loadings.

In this respect, a loading mode is a mode to which a changeover is made when the wind is so strong that the rotation speed and the generator power have to be reduced in order to protect the wind turbine. A loading mode of this kind can be triggered depending on the loading variable, that is to say when the loading variable, for example, exceeds a loading trigger limit value, which can be identical to the loading limit value, or is at another value, in particular a lower one. However, the loading mode can also be switched on in another way, for example, depending on a detected wind speed. A loading mode of this kind can also be switched on depending on a blade angle. One possible criterion is also that variables of this kind are combined. In particular, the evaluation of the loading variable and a blade angle is possible.

BRIEF DESCRIPTION OF THE SEVERAL VIEWS OF THE DRAWINGS

The invention will be explained in more detail below by way of example using exemplary embodiments with reference to the accompanying figures, in which.

DETAILED DESCRIPTION

Figure 1:
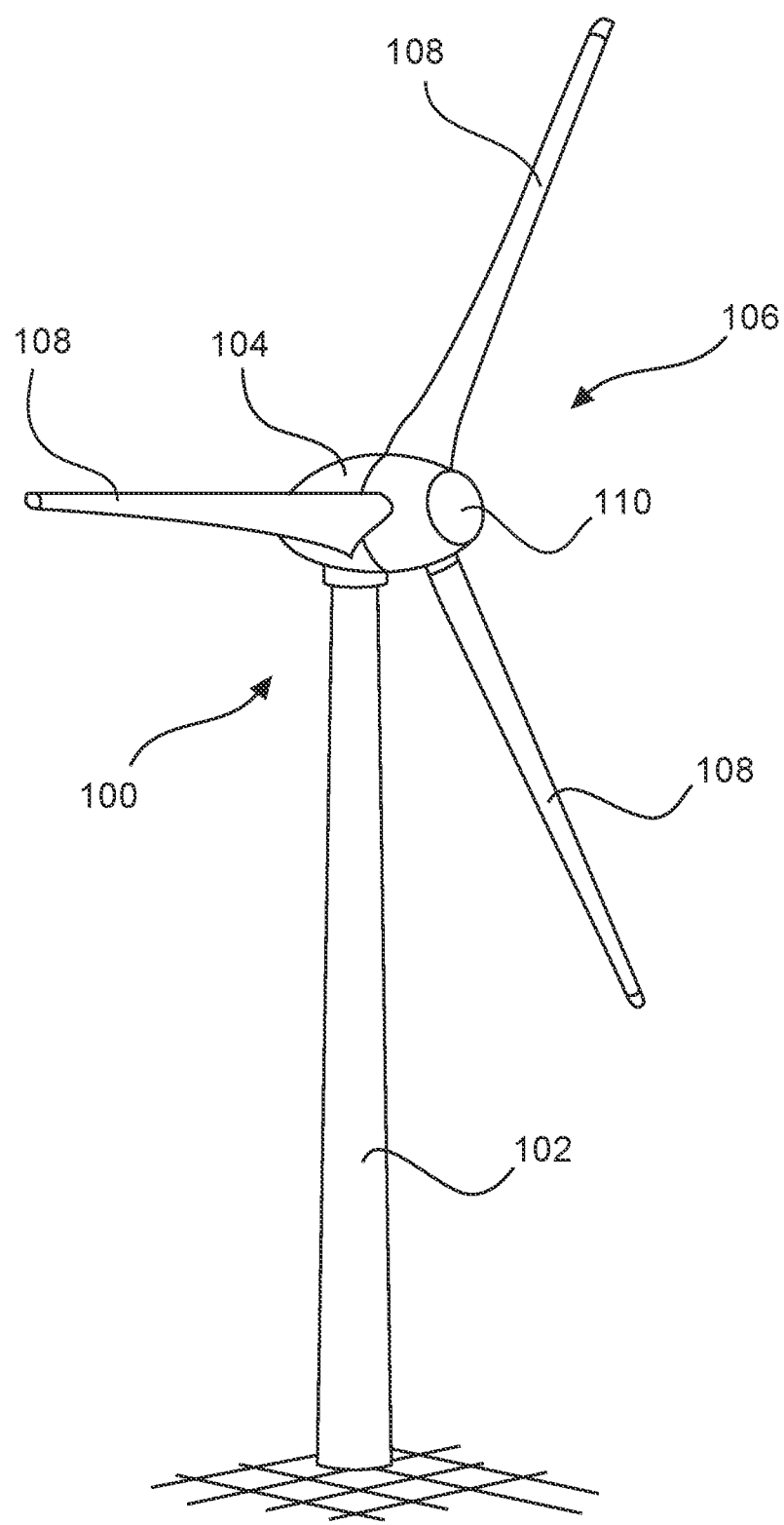
FIG. 1 shows a perspective illustration of a wind turbine.

FIG. 1 shows a wind turbine 100 having a tower 102 and a nacelle 104. A rotor 106 with three rotor blades 108 and a spinner 110 is arranged on the nacelle 104. The rotor 106 is caused to rotate by the wind during operation and in this way drives a generator in the nacelle 104.

Figure 2:
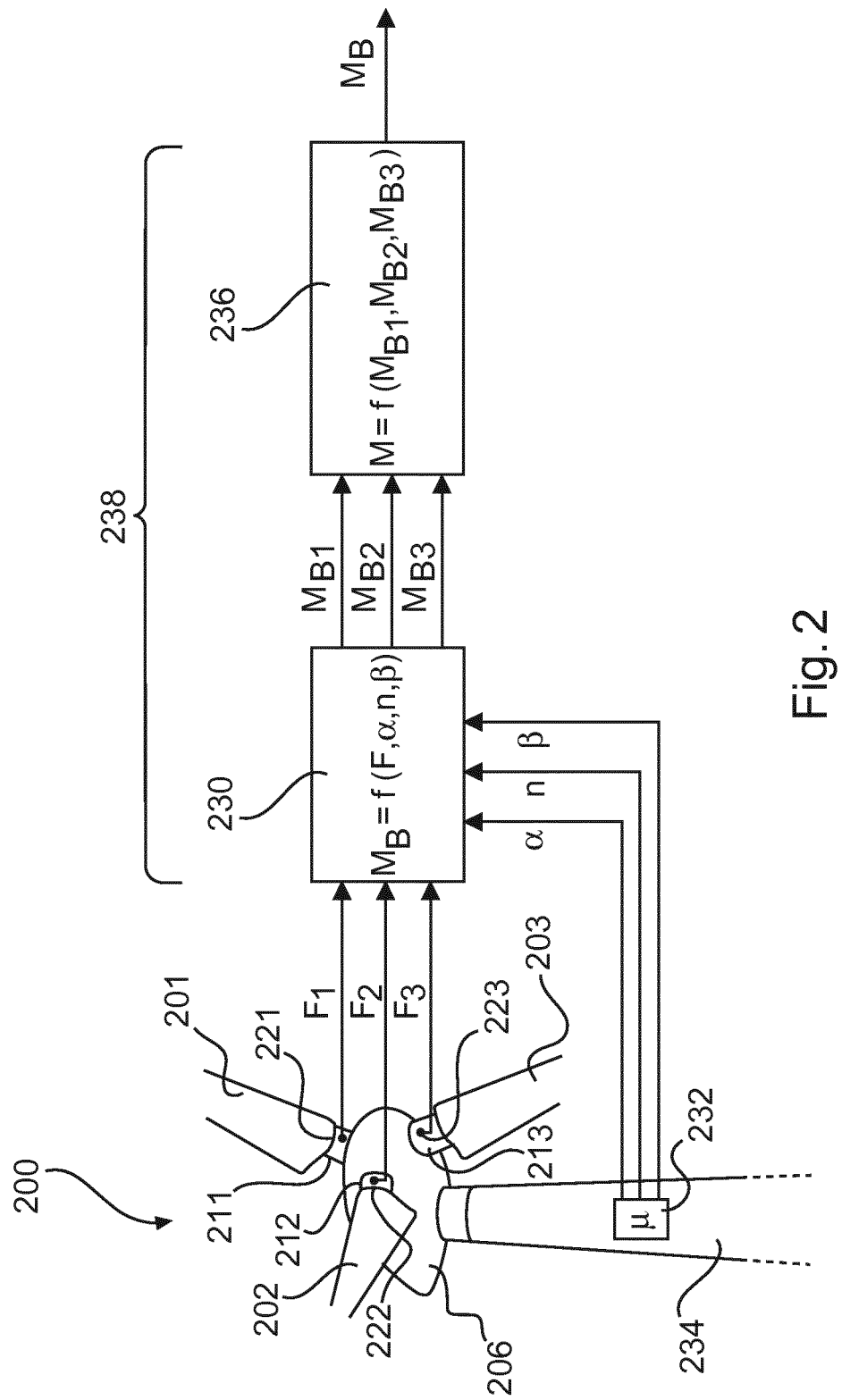
FIG. 2 shows an illustrative structure for detecting a hub bending moment as the loading variable.

FIG. 2 symbolically shows a portion of a wind turbine 200. This wind turbine 200 has three rotor blades 201, 202 and 203. Said rotor blades are fastened to a hub which is arranged in the nacelle 206. The three rotor blades 201, 202 and 203 are each fastened to said nacelle by means of a blade root 211, 212 and, respectively, 213. A strain gauge 221, 222 and, respectively, 223 is arranged on each blade root 211 to 213 as a force-measuring means. FIG. 2 shows a respective strain gauge 221 to 223 for each blade root 211 to 213. However, at least two strain gauges, which are offset in relation to one another through 90°, are preferably to be provided for each blade root. In any case, in each case one force variable $F_1$, $F_2$ and, respectively, $F_3$ is determined with each strain gauge 221 to 223. Here, these force variables can be bending moments which result from measurement values of a respective strain gauge. These three force variables $F_1$ to $F_3$ are input into the detection block 230. In this case, the force variables $F_1$ to $F_3$ can each also be vectorial variables which indicate the corresponding forces on the respective blade root 211 to 213 in respect of magnitude and direction. These force variables $F_1$ to $F_3$ that are detected in this way are therefore initially detected in the detection block 230.

In addition, a blade angle α, the rotation speed n and a rotor position β are input into the detection block 230. In the case of individual blade adjustment, that is to say when it is possible to adjust the rotor blades individually, specifically each individual rotor blade independently of the two other rotor blades, the three individual blade angles $\alpha_1$, $\alpha_2$ and $\alpha_3$ can also be recorded instead of the one blade angle α.

An operating control block 232 is illustrated for recording these variables, specifically the one or more blade angles α, the rotor rotation speed n and the rotor position β. The use of this operating control block 232 is particularly also intended to illustrate that said variables are known in principle in the operational control arrangement of the wind turbine 200. In this respect, these variables need to be taken only from the operational control arrangement, for which the operating control block 232 is symbolically illustrated here. The operating control block 232 is illustrated in an upper region of the tower 234 only for reasons of illustration. However, the operational control arrangement, and therefore also an operating control block 232 of this kind, can usually be arranged in the nacelle 206, and these variables can be directly obtained from an overall operational control arrangement there.

In any case, the detection block 230 calculates a respective hub bending moment component $M_{B1}$, $M_{B2}$ and $M_{B3}$ from the variables which are input in said detection block. These hub bending moment components $M_{B1}$, $M_{B2}$ and $M_{B3}$ are each based on the detected force variables $F_1$, $F_2$ and, respectively, $F_3$. In other words, a hub bending moment component $M_{B1}$, $M_{B2}$ and, respectively, $M_{B3}$, which can also be called blade root bending moments, is in each case calculated from a force variable $F_1$, $F_2$ or $F_3$, and the variables α, n and β, that is to say the blade angle α, the rotor rotation speed n and the rotor position β, are also taken into consideration for this calculation. The first intermediate result of this detection block 230 is therefore these three hub bending moment components $M_{B1}$ to $M_{B3}$, which can each also be represented as vectors. Each of these hub bending moment components $M_{B1}$ to $M_{B3}$ is therefore preferably not only an individual scalar value, but rather a vector which indicates amplitude and direction. These three variables are then combined in the combination block 236 to form a single loading variable, specifically using the example of FIG. 2 to form a common hub bending moment $M_B$. This common hub bending moment $M_B$ can be, for example, a vectorial sum of the three individual vectors $M_{B1}$, $M_{B2}$ and $M_{B3}$ when these individual hub bending moment components $M_{B1}$ to $M_{B3}$ are each vectors. If this calculation is based only on the magnitudes, an average value can be calculated in the combination block 236 for example, just to mention a further example.

In any case, FIG. 2 illustrates how an individual loading variable, here specifically the hub bending moment $M_B$, can be determined from the force measurements at the blade roots 211 to 213 by means of the strain gauges 221 to 223.

Figure 3:
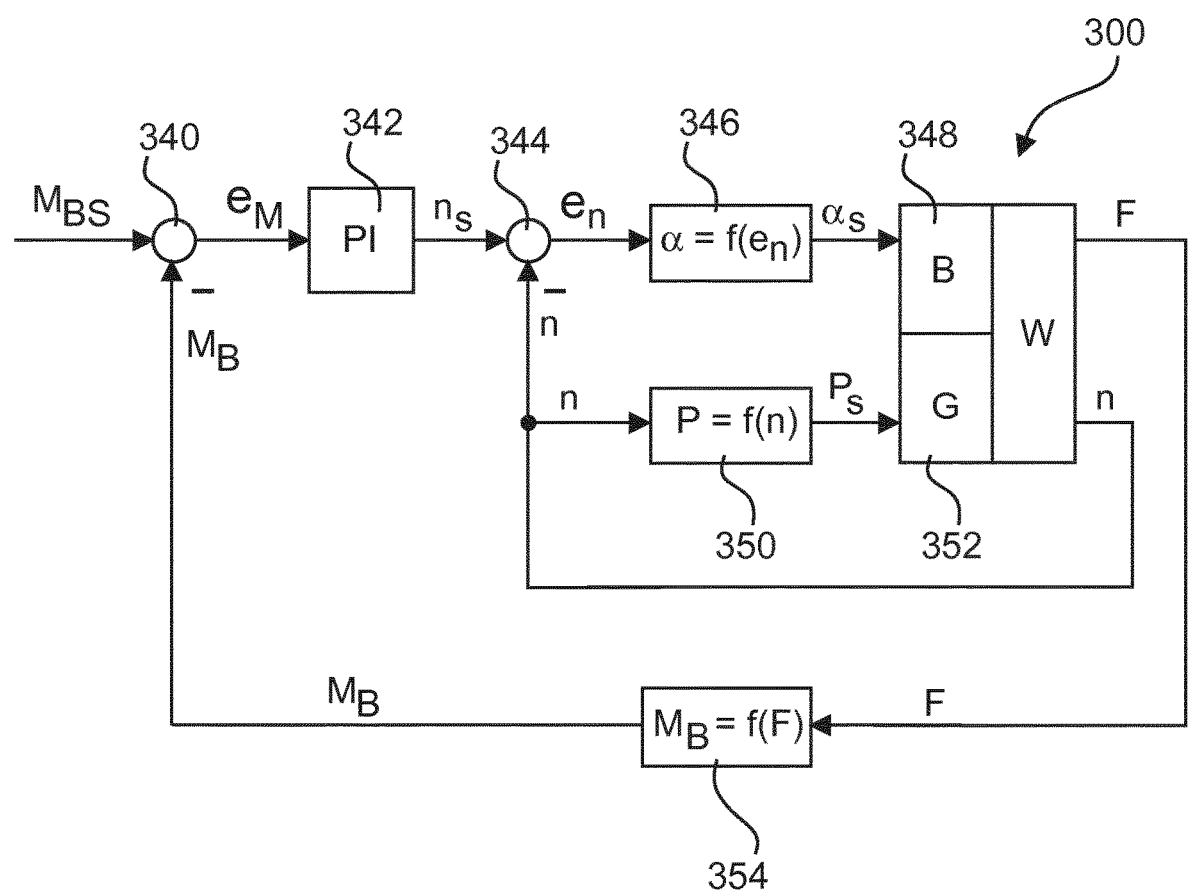
FIG. 3 shows a structure for reducing the rotation speed and the generator power in a loading mode.

The hub bending moment $M_B$ that is determined as illustrated in FIG. 2 is then used, for example, according to a structure according to FIG. 3, for the purpose of controlling the wind turbine in a loading mode.

Moreover, the strain can also be measured, and then conclusions can be drawn about blade root bending moments by means of weight-based calibration. As an alternative, this can also be carried out in the detection block 230.

In the control structure according to FIG. 3, provision is made for the determined hub bending moment $M_B$ to be subtracted from a setpoint value for the hub bending moment $M_{BS}$ in the summing element 340. The result is a control error, which is called a control deviation, specifically a moment control deviation $e_M$ here. This moment control deviation $e_M$ is then input into a PI control block 342 and this PI control block 342 outputs a setpoint rotation speed $n_S$ as the result.

The current rotation speed of the wind turbine 300 is then subtracted from this setpoint rotation speed $n_S$, that is determined in this way, in the rotation speed summing element 344. The result is the rotation speed control deviation $e_n$. Said rotation speed control deviation is input into an angle determining block 346 which determines a blade angle $\alpha_S$, that is to be set, from said rotation speed control deviation. In this respect, this blade angle $\alpha_S$ is a setpoint value and is input into the wind turbine 300 for corresponding conversion for blade adjustment.

Here, the wind turbine 300 is depicted only highly schematically as a corresponding block which is subdivided into a blade angle range B, a generator region G and the rest of the wind turbine W. The setpoint angle $\alpha_S$ therefore acts on the blade region 348.

At the same time, the rotation speed n is input into the power block 350 which determines a setpoint power $P_S$ from said rotation speed, which setpoint power is input into the generator region 352.

In particular, these two values, specifically the blade setpoint angle $\alpha_S$ and the setpoint power $P_S$, now form the input variables for the wind turbine 300 for this consideration. By way of precaution, it should be noted that this is based on only one blade angle $\alpha_S$. It goes without saying that it is also possible to set individual blade angles. In this case, the blade angle $\alpha_S$, which forms the output of the angle determining block 346 here, can be considered to be the main angle to which any individual adjustments of the individual angle can be correspondingly added in each case.

In any case, the result of the wind turbine 300 is at least one force variable F, which can be made up of the three individual forces $F_1$, $F_2$ and $F_3$ according to the illustration of FIG. 2 here. This force variable F is then entered into the detection device 354. The detection device 354 can, for example, be made up of the detection block 230 and the combination block 236 according to FIG. 2. In this respect, the two blocks, specifically the detection block 230 and the combination block 236, can also be called the detection device 238.

In any case, the structure of FIG. 3 functions in combination as follows. In the loading mode, this structure initially operates according to FIG. 3. Then, load-dependent correction takes place in principle such that the hub bending moment $M_B$ is corrected to the setpoint value of the hub bending moment $M_{BS}$. This takes place such that the moment control deviation $e_M$ by the PI controller according to the PI control block 342 leads to a setpoint rotation speed. Therefore, if the hub bending moment $M_B$ has precisely reached its setpoint value $M_{BS}$, the control deviation is zero and the setpoint rotation speed is then kept at its last value on account of the integral component in the PI control block 342.

The conversion of this setpoint rotation speed into an actual rotation speed takes place by the control loop which begins with the setpoint/actual value comparison in the rotation speed summing element 344. The result of this setpoint/actual value comparison, specifically the rotation speed control deviation $e_n$, is then converted via the angle control block 346 into a corresponding angle, specifically initially as a setpoint value which is then actually converted in the blade region 348.

However, at the same time, a power, specifically a generator power, is prespecified in accordance with a characteristic curve depending on the rotation speed. Accordingly, a rotation speed-dependent power characteristic curve is stored in the power block 350. Accordingly, the power block 350 outputs a setpoint value for the power and this setpoint value $P_S$ is converted in the generator region 352. If this leads to a change in power, the rotation speed can also change and the power is then adjusted in accordance with the characteristic curve and therefore by the power block 350.

If the power is reduced as a result, the generator torque is therefore also reduced, and this can, in turn, lead to an increase in rotation speed. This is counteracted in the rotation speed control arrangement particularly by the angle determining block 346 by way of the blade angle then being reduced. However, this can, in turn, also lead to a change in the loading and therefore to a change in the force variable F. Accordingly, the hub bending moment $M_B$ can then change and this can lead to a change in the setpoint rotation speed by means of the moment control deviation $e_M$ and the PI control block 342.

In any case, this structure leads, in the case of an increase in the hub bending moment which is to be countered as a result, to initially the rotation speed being lowered and, depending on this, the power also being adjusted, specifically reduced, on account of a characteristic curve in the power block 350.

The invention claimed is:

1. A method for operating a wind turbine for generating electrical power from wind, wherein:
    the wind turbine has an aerodynamic rotor with a rotor hub and a plurality of rotor blades, wherein blade angles of the plurality of rotor blades are adjustable, each rotor blade having a respective rotor blade root configured to couple the respective rotor blade to the rotor hub, wherein the aerodynamic rotor is configured to be operated at a variable rotation speed,
    the wind turbine has a generator, which is coupled to the aerodynamic rotor, and
    the generator is configured to be operated with a variable generator torque, wherein the method comprises:
        determining a loading acting on the wind turbine by the wind, wherein determining the loading comprises:
            determining a plurality of forces using a plurality of strain gauges, each of the plurality of strain gauges being coupled to a respective rotor blade root of the plurality of rotor blades, using the plurality of forces to calculate a plurality of hub bending moments acting on the rotor hub, wherein the plurality of hub bending moments vary between maximum and minimum hub bending moments depending on a position of the rotor, and using the maximum bending moment as the determined loading, comparing the determined loading to a predefined loading limit value, and reducing at least one of a rotation speed or a generator power of the wind turbine in response to the determined loading reaching or exceeding the predefined loading limit value.

2. The method as claimed in claim 1, wherein reducing the at least one of the rotation speed or the generator power of the wind turbine comprises reducing the rotation speed, and the rotation speed is reduced by adjusting the blade angle of each rotor blade of the plurality of rotor blades in a direction away from the wind, the method further comprising reducing the generator torque as wind speed increases.

3. A wind turbine configured to execute the method as claimed in claim 1.

4. The method as claimed in claim 1, wherein the reducing comprises reducing the rotation speed such that a rotation speed range of the aerodynamic rotor is between 10% to 90% of a nominal rotation speed of the aerodynamic rotor.

5. The method as claimed in claim 1, wherein the plurality of rotor blades are three rotor blades, and the plurality of strain gauges are three strain gauges.

* * * * *